Feb. 23, 1943. H. C. PYLE 2,311,963
GAS ANCHOR
Filed July 11, 1939 2 Sheets-Sheet 1
Fig. 1.
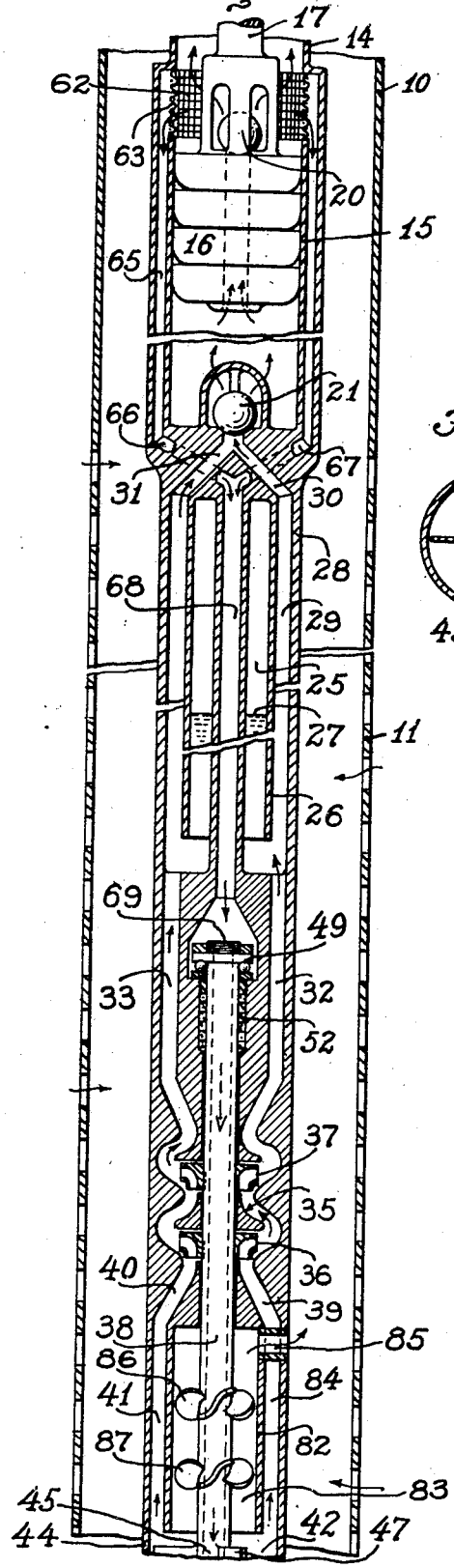
Fig. 2.
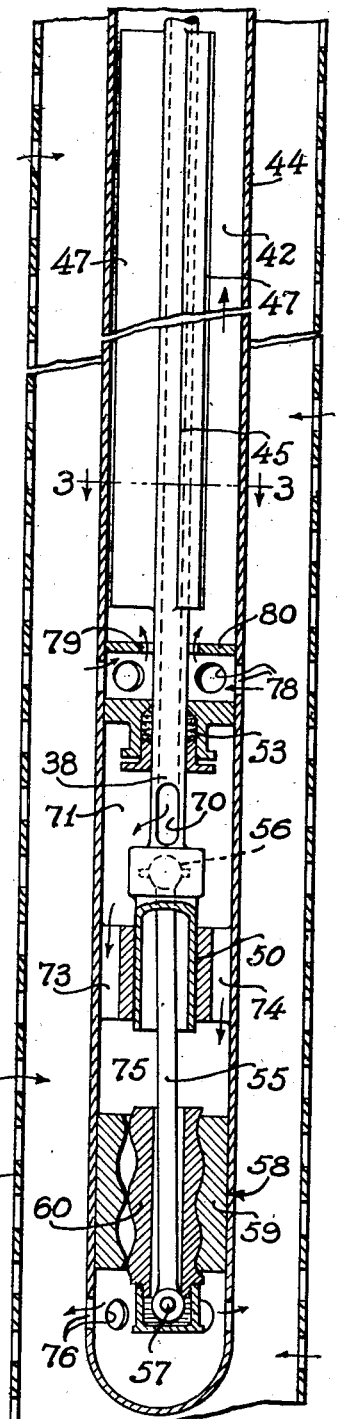
Fig. 3.
INVENTOR
Howard C. Pyle
BY Philip Subkow
ATTORNEY.

Feb. 23, 1943.  H. C. PYLE  2,311,963
GAS ANCHOR
Filed July 11, 1939   2 Sheets-Sheet 2
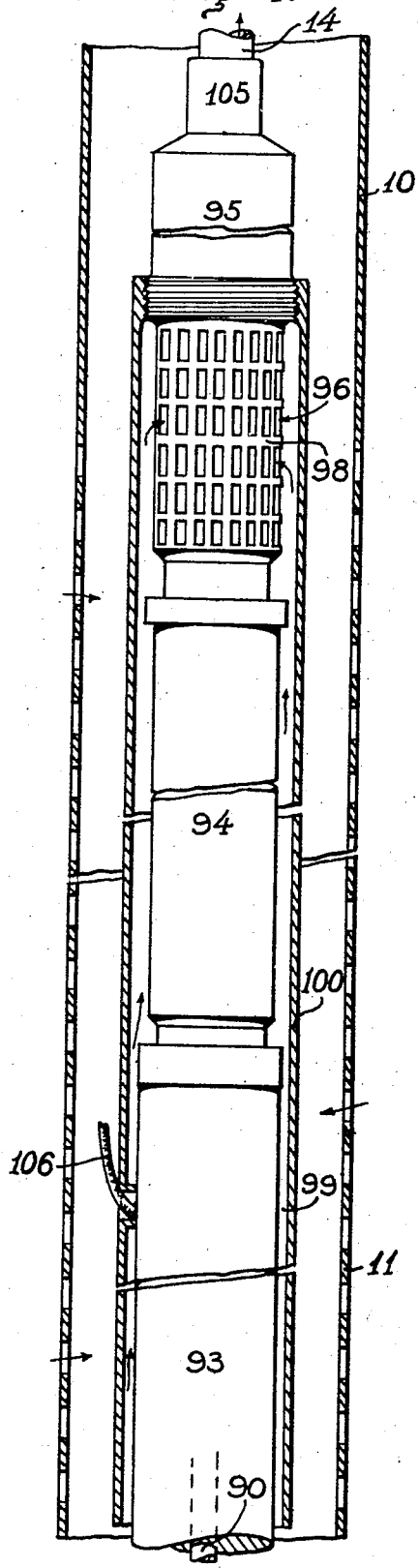
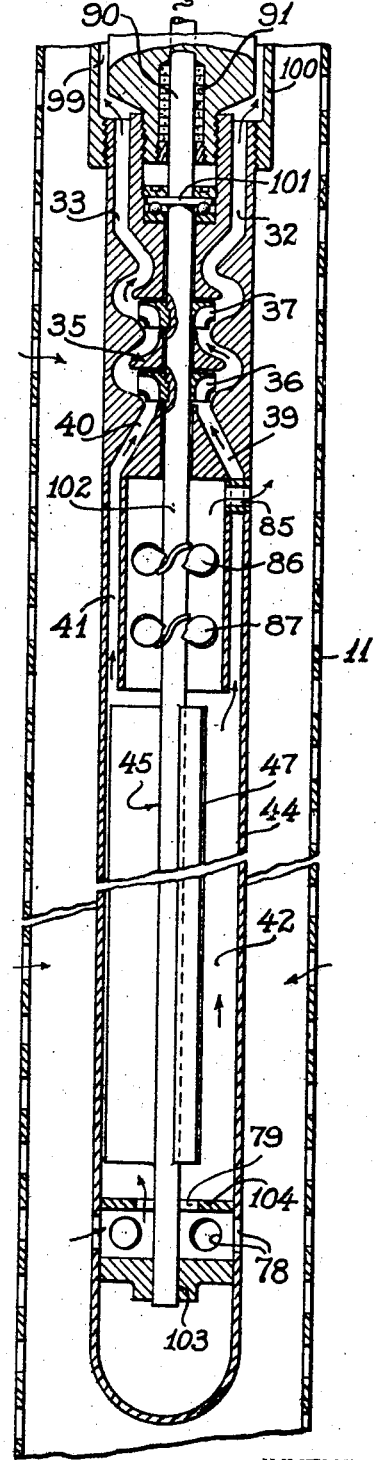
INVENTOR
Howard C. Pyle
BY Philip Subkow
ATTORNEY.

Patented Feb. 23, 1943

2,311,963

UNITED STATES PATENT OFFICE 2,311,963

GAS ANCHOR

Howard C. Pyle, Glendale, Calif., assignor to Union Oil Company of California, Los Angeles, Calif., a corporation of California Application July 11, 1939, Serial No. 283,792

7 Claims. (Cl. 103—5)

This invention relates to improvements in the separation of liquid and gas mixture and specifically to the separation of oil and gas within a pumping oil well by means known as a "gas anchor" and is a continuation in part of my co-pending application Serial No. 216,086 filed June 27, 1938, patented June 2, 1942, No. 2,285,169.

The primary object of this invention is to provide an apparatus for increasing the volumetric efficiency of an oil well pump by effecting separation from the produced oil flowing into the well bore of a substantial portion of the dispersed gases and dissolved gases present in the oil in a state of supersaturation before it reaches the well pump cylinder. Another object of the invention is to provide an improved device which will effectively separate oil and gas and which can be readily attached to the inlet of the conventional well pump cylinder located and supported by the tubing at or near the bottom of the well. Another object of the invention is to provide means of agitating the produced oil containing dissolved gas prior to its entrance into the pump cylinder whereby equilibrium is promoted and gas which is present in solution in excess of saturation is caused to be liberated rapidly from the solution and to be separated from the oil prior to the entrance of the oil into the pump cylinder. Another object of this invention is to provide means to increase the inlet pressure of the fluid entering the pump to compensate for the drop in pressure at the inlet valves and passages through the gas separation chamber whereby the volumetric efficiency is increased. It is also an object of the invention to improve the gas separation from the liquid by providing means to discharge positively separated gas from the gas separation zone.

With these objects in view this invention resides broadly in an apparatus for effecting agitation of the produced gas-containing oil at the bottom of a pumping well whereby gas is separated therefrom prior to its entrance into the pump cylinder and whereby the volumetric efficiency of the pump is increased. The invention more specifically resides in means for applying centrifugal force and agitation to the oil in a pumping well whereby gas is separated from the oil prior to its entrance into the pump cylinder. The invention also resides in an apparatus for increasing the inlet pressure of the liquid entering the pump and to expel positively separated gas from the separator. These and other objects and features of novelty will be evident hereafter.

In the drawings, which illustrate by way of illustration preferred embodiments of the invention and in which like numerals designate similar parts throughout the several views;

Figure 1 is a partial cross-sectional elevation of the gas anchor separator mechanism in place in the perforated casing in the well together with a partial cross-sectional view of a reciprocating type of well pump to which it is adapted.

Figure 2 is a lower extension of the apparatus shown in cross-section in Figure 1.

Figure 3 is a cross-section taken at line 3—3 of Figure 2 through the gas separation chamber.

Figures 4 and 5 illustrate a partial cross-sectional elevation of an optional adaptation of the gas anchor to an electrically driven turbine type of oil well pump.

Referring to Figures 1, 2 and 3 of the drawings, 10 is an oil string, casing or liner carrying a perforated section 11 opposite the producing formation and adapted to be suspended from a casing in the well, as is conventional practice. The oil tubing 14 is suspended in the well and within the casing from the casing head in the conventional manner and may extend downward into the well as shown in the drawings to a point adjacent the producing zone within the perforated casing 11. At the lower end of the tubing is attached a pump barrel 15 in which the pump plunger 16 is operated by means of suitable sucker rods 17 extending to the top of the well and adapted to be reciprocated by means of a walking beam, such as is conventionally employed in pumping wells. The pump plunger carries a travelling valve 20 and a standing valve 21 is provided in the lower end of the pump barrel.

Extending from the lower end of the pump barrel and communicating with the standing valve and the pump barrel inlet is a surge chamber 25 formed by a downwardly extending section of tubing 26 supported at the top and making gas tight connection with the lower end of said pump barrel. The surge chamber 25 is thus in the form of an annular space in which a cushioning body of gas may be entrapped above a liquid level as shown at 27.

Also extending from the lower end of the pump is a cylindrical casing 28 concentrically surrounding the surge chamber 25 and the surge chamber tubing 26 forming between said surge chamber wall 26 and said cylindrical casing 28, an annular passageway 29 communicating at the upper end through ducts 30 and 31 with the pump inlet and at the lower end through ducts 32 and 33 with the discharge of a multi-stage centrifugal booster pump 35. The said booster pump 35 comprises, by way of illustration here, two centrifugal stages of which 36 and 37 are the first and second stage impellers respectively mounted upon and keyed to a hollow rotatable shaft 38 which in turn is connected at its lower end with a prime mover, described hereinafter. The suction or inlet end of the booster pump 35 is connected by means of ducts 39 and 40 and through the annular space 41 to the top of a gas separating chamber 42.

The gas separating chamber 42 comprises a tubular casing 44 downwardly extending from the booster pump body and containing a rotor 45 positioned therein. The rotor 45 comprises a plurality of vanes 47 radially extending from the hollow shaft 38, the whole being rotatable with slight clearance at the edges of said vanes within the inside surface of the cylindrical gas separating chamber 44. The hollow shaft 38 is rotatably mounted and supported at the top upon a ball bearing 49 and at the lower end in plain journal bearing 50 of enlarged diameter. The shaft 38 passes through stuffing boxes 52 and 53. The lower end of shaft 38 is coupled by means of a rod 55 through universal joints 56 and 57 to the prime mover 58 by means of which the whole shaft upon which the vanes 47 are mounted may be rapidly rotated.

The prime mover, by way of illustration here, comprises a fluid operated rotary motor having helically grooved stator 59 and rotor 60. This turbine may be constructed in accordance with the disclosures of U. S. patents to Moineau, Numbers 1,892,217 and 2,028,407.

Pressure fluid for the operation of the rotary motor is obtained from the tubing 14 at point 62 above the pump barrel whereby it is maintained under the static pressure of the fluid column extending upwardly to the top of the well. A screen 63 is provided at the fluid pressure connection 62 at the tubing to exclude sand or other foreign particles which may be entrained in the produced liquid from reaching the fluid operated motor. The pressure fluid withdrawn from the tubing 14 at 62 is free to flow downward through the annular space 65 surrounding pump barrel through the ducts 66 and 67 and the central tubing passageway 68 to the top 69 of the hollow shaft 38 and thence through the hollow shaft to the side outlet 70 into the chamber 71 formed in the casing between the stuffing box 53 and the shaft supporting bearing 50. From the said chamber 71 the pressure fluid may flow through the ducts 73 and 74 to the chamber 75 which communicates with the upper inlet end of the rotary motor 58. The exhaust from the motor 58 may pass out to the space in the perforated casing through a plurality of exhaust ports 76.

A plurality of inlet ports 78 are provided to allow liquid in the well to pass into the gas separating chamber 42 through the annular passage 79 formed between the hollow shaft 38 and an annular baffle 80.

Extending from the lower portion of the booster pump body is shown a concentrically disposed sleeve 82 forming an inner annular space 83 about the shaft 38 and an outer concentric annular space 84 inside of the casing 44. The inner annular space 83 is vented to the outside of the gas anchor through a port 85 and this chamber contains a pair of impellers 86 and 87 adapted to force the fluid entrapped in said annular space 83 upward and outward through said vent 85.

The outer annular space 84 is connected to the suction inlet of the booster pump 35 through the before-mentioned ducts 39 and 40.

The apparatus illustrated in Figures 4 and 5 is similar to that illustrated in Figures 1, 2 and 3 except that the gas anchor apparatus is shown by way of illustration as adapted to be connected to an oil well pump of the centrifugal or rotary pump type and instead of employing a pressure fluid operated motor, as shown at 58 in Figure 2, as a prime mover for the rotation of the gas separation apparatus, rotation of these parts is accomplished by means of a suitable connection with a lower shaft extension from the drive of the centrifugal or rotary well pump which is shown as extending from the lower end of the electrical pump unit through packer 91 in Figure 5.

The centrifugal or rotary well pump to which the apparatus of this invention is adapted to be connected, may be of any suitable well known design, such as, for example, the Reda electrical centrifugal oil well pump manufactured by the Reda Pump Company of Bartlesville, Oklahoma, as illustrated, in part, in Figure 4, employing an electrical motor driving unit 93, a protector unit 94 which seals the motor from the pump and a centrifugal pump unit 95. The suction inlet to the electrically driven centrifugal pump is shown at 96 covered by strainer grating 98. Communication between the discharge of the booster pump 35 and the suction inlet 96 of the said centrifugal pump 95 is provided through annular space 99 formed between the electrically driven well pump and a tubular cover 100.

As stated above, a shaft 90 extending from the free end of the electric drive motor 93 makes connection by means of suitable coupling at 101 with the top of the solid shaft 102 upon which the booster pump impellers 36 and 37, the gas separator rotor vanes 47 and the impeller blades 86 and 87 are mounted. The lower end of shaft 102 is rotatably supported in bearing 103.

Fluid inlet to the gas separating chamber 42 is provided by means of a plurality of ports 78 as in Figure 2. A vent for separated gas from the gas separating chamber is provided at 85 as in Figure 1.

The discharge from the electrically driven centrifugal well pump 95 is connected to the lower end of the well tubing 14 at 105 in the conventional manner. Electrical connection is made to the electric motor drive 93 by means of electrical conductor as shown in part at 106. The electrical conductor 106 extends to the top of the well through the annular space between the pump housing and the liner 10 and makes connection with a suitable source of electric power as is conventional installation practice of pumps of this type.

The operation of the apparatus of Figures 1, 2 and 3 is as follows: Oil under the force of gravity, or by the residual expulsive force of gas or water, flows from the surrounding formation through the perforated casing 11 and accumulates in sufficient quantity within the casing to flow through the inlet ports 78 and through annular space 79 surrounding the shaft 38 into the gas separating chamber 42 within the enclosing shell 44. Oil under the pressure of the fluid head accumulated in the casing continues its flow upward through the gas separator 42 and through the outer annular passage 41 and through the inlet ducts 39 and 40 to the suction of the booster pump 35. Ordinarily, there is also sufficient fluid head of accumulated oil in the casing to cause the oil to flow upward through the passages in the impellers 37 and 38 of the booster pump through the ducts 32 and 33 and on through ducts 30 and 31 and finally through the standing valve 21 into the reciprocating pump barrel 15.

Under normal operating conditions, the pump plunger 16 carrying the traveling valve 20 is reciprocated within the pump barrel 15, thus drawing oil through the standing valve 21 and forcing it upward through the traveling valve 20 into the tubing 14 and thus maintaining an upward moving column of oil above the pump plunger 20 and extending to the top of the well. The oil pressure in the tubing 14 near the bottom of the well and at the point 62 above the pump barrel is thus under a high fluid pressure head which is dependent upon the depth of the well, the density of the fluid and the back pressure upon the delivery line at the top of the well. At this point 62 in the oil tubing above the pump, pressure oil is withdrawn through the screen 63 into the annular passage 65 formed between the outside surface of the pump barrel 15 and the surrounding casing through ducts 66, 67 and 68 through the hollow shaft 38 and out through the side opening 70 in said hollow shaft into the chamber 71 where the oil accumulates under the tubing pressure head. From the chamber 71 the pressure oil continues downward through the ducts 73 and 74 to the inlet 75 leading to the fluid operated rotary motor 58. The pressure oil from the rotary motor 58 is discharged through the ports 76 into the accumulated fluid in the casing.

The passage of the pressure fluid through the motor 58 causes the rotor 60 to rotate rapidly about its longitudinal axis. This rotation of the rotor 60 is communicated through a universal joint 57 to the shaft 55 and thence through the universal joint 56 to the hollow shaft 38 upon which the gas separator rotor vanes 47, the separated gas impeller blades 86 and 87 and the booster pump impellers 36 and 37 are carried. The pressure available for operating the said motor 58 is the differential between the tubing pressure at 62 and the bottom hole pressure at the level of the turbine discharge ports 76 and this differential pressure in the case of a low pressure formation and a moderately deep well may range from 1,000 to 3,000 pounds per square inch. The differential pressure actually applied in the motor 58 may be adjusted by any suitable means such as a throttle valve or by restricting the size of the ducts 66 and 67 through which the pressure oil passes. Under average operating conditions the rotary motor 58 and the gas separator 46 carrying the blades 47 may be operated at a speed ranging between approximately 1,000 and 4,000 revolutions per minute.

The oil containing dissolved and entrained gas which enters the gas separator chamber 42, as hereinbefore described, is thus imparted rapid rotational movement by means of the rotor blades 47 as the mixture passes upward toward the centrifugal booster pump 35. Under the effect of the agitation and the centrifugal force imparted to the oil-gas mixture by its rotation in the gas separator chamber 42, a substantial amount of the supersaturated gas is caused to be released from solution and the thus released and entrained gas under the influence of the said centrifugal force, the said gas being of greatly different specific gravity than the oil from which it is thus separated, is forced toward the center of the separating chamber and into a region immediately surrounding the rotor shaft 38. The separated gas then passes upward along the surface of the shaft 38 parallel with the general flow of the oil until it is entrapped within the inner annular space 83 and from there, together with a quantity of oil is exhausted with the aid of the impellers 86 and 87 from the apparatus through the gas vent 85. The said impellers 86 and 87 under rapid rotation upon the shaft 38 insure the positive discharge of the gas-oil mixture accumulated in the annular space 83, outward through the gas vent 85 into the annular space surrounding the gas anchor and within the casing.

The oil from which the gas has thus been removed flows upward into the outer annular space 41 and thence through the ducts 39 and 40 to the suction of the booster pump 35. The relatively gas-free oil thus reaching the centrifugal booster pump 35 is forced upward with the increased pressure through the ducts 32 and 33 and into the surge chamber 25. The centrifugal booster pump may be constructed with any suitable number of stages, it being generally desirable to provide a sufficient "boost" or increase in oil pressure at this point to overcome friction losses throughout the passages through the gas anchor and to deliver the oil into the reciprocating pump barrel at, or preferably slightly above, the fluid head of the accumulated oil in the casing surrounding the pump at this point. The suction pressure to the inlet of the well pump is thus maintained equal to or preferably slightly higher than that which it would be if making direct connection with the accumulated fluid in the well.

The oil delivered through ducts 32 and 33 to the surge chamber 25 rises therein to a liquid level as shown at 27 against the pressure of accumulated and entrapped gas in the annular space 25 and continues to flow upward through the annular space 29 and through the ducts 30 and 31 and through standing valve 21 to the pump barrel under the combined fluid pressure of the accumulated oil in the casing and the discharge pressure of the centrifugal booster pump 35. In apparatus such as that illustrated in Figure 1 employing a reciprocating plunger pump, the fluid inlet to the pump barrel will necessarily be intermittent. This requires that the oil supplied to the pump barrel 15 through the standing valve 21 be intermittent and of sufficient pressure and volume to fill the pump barrel on each upward stroke of the plunger without detrimental drop in pressure thereof. It is the purpose of the before-mentioned surge chamber 25 to supply these necessary surges of oil to the suction of the pump and this is accomplished in the surge chamber by intermittent lowering of the liquid level 27 under the force of the compressed gas entrapped in the annular space 25, the expansion of gas in the annular space 25 being of sufficient volume to displace the required amount of oil from the surge chamber to supply the variations in the intermittent demand of the reciprocating pump.

The operation of the apparatus of Figures 4 and 5 is as follows: The accumulated fluid in the casing 11 enters the gas separating chamber 42 by way of the inlet ports 78 and annular space 79. The separation of oil and gas is effected in 42 as described hereinbefore and the thus separated gas vented through 85. The oil from which the gas is separated passes upward in the gas separating chamber 42 through the annular space 41 and through the ducts 39 and 40 to the inlet of the centrifugal booster pump 35. From the centrifugal booster pump 35 the oil continues upward through ducts 32 and 33 and through the annular space 99 inside of the enclosing casing 100 to the suction inlet 96 of the centrifugal or rotary well pump 95 from which it is in turn discharged under pressure into the tubing 14 which extends to the top of the well. The shaft 102 upon which the gas separator rotor vanes 47, the gas discharge impellers 86 and 87 and the booster pump impellers 36 and 37 are mounted, is rotated by means of the electric motor drive 93 through a shaft extension 98 therefrom to which it is coupled at 101.

It is to be noted that the gas separator, comprising the chamber 44 and the rotor blades 47, in itself operates in a degree as a centrifugal pump. The annular baffle 104 serves to confine the oil from which gas has been separated, under pressure over the inside surface of said cylinder 44 and thus the oil withdrawn from the gas separating chamber through the annular space 41 is under slightly increased pressure over that entering the chamber through the annular opening 79 immediately surrounding the shaft 102. The gas separator and the booster pump 35 thus both combine to increase the inlet pressure to the centrifugal pump 93.

The rotor vanes 47 may be varied somewhat in design. For example, the rotor blades or vanes instead of extending radially from a shaft 24 may extend at a slight angle therefrom or the rotor blades may be spirally arranged around the shaft in such a manner as to further aid in lifting the fluid from the inlet 79 toward the top of the gas separating chamber.

It is to be understood that the foregoing is illustrative of but one apparatus and that the invention is not limited thereby but may include any apparatus which accomplishes the same within the scope of the invention.

I claim:

1. In a pumping well, the combination of a well tubing, a pump connected at the lower end of said tubing, a gas separating chamber connecting with the inlet of said pump and communicating with the fluid in the well, means in said chamber to separate liquid and gas, and means to forcefully expel separated fluid from said chamber, said means to expel the separated fluid from said chamber comprising a plurality of rotatable blades.

2. In a pumping well the combination of a well tubing, a pump connected at the lower end of said tubing, means to increase the inlet pressure of liquid entering said pump and a surge chamber intermediate said pump inlet and said pressure increasing means.

3. In a pumping well the combination of a pump, a gas separating chamber communicating with the inlet of said pump, means intermediate said chamber and said pump inlet to increase the inlet pressure of fluid entering said pump from said chamber and a surge chamber intermediate said pump inlet and said means to increase the inlet pressure.

4. In a pumping well the combination of a pump connected at the lower end of said tubing, a gas separating chamber connecting with the inlet of said pump and communicating with the fluid in the well, and a surge chamber intermediate said pump inlet and said gas separating chamber.

5. In a pumping well the combination of a pump connected at the lower end of said tubing, a gas separating chamber connecting with the inlet of said pump and communicating with the fluid in the well, means in said chamber to separate liquid and gas and means to forcefully expel separated gas from said chamber, means intermediate said gas separating chamber and said pump inlet to increase the inlet pressure of fluid from said chamber and entering said pump, and means intermediate said inlet pressure increasing means and said pump inlet to equalize pump inlet surges in said liquid entering said pump.

6. Apparatus according to claim 5 in which the means to increase the inlet pressure to the pump comprises a centrifugal pump and means associated therewith to rotate said pump.

7. Apparatus according to claim 5 in which the means to increase the inlet pressure to the pump comprises a booster pump driven by pressure fluid withdrawn from the well tubing.

HOWARD C. PYLE.